United States Patent
Namimatsu et al.

Patent Number: 5,493,929
Date of Patent: Feb. 27, 1996

[54] THIN WALL TYPE BALL NUT

[75] Inventors: Ken Namimatsu; Nobuhide Kurachi, both of Gunma, Japan

[73] Assignee: NSK Ltd., Tokyo, Japan

[21] Appl. No.: 217,052

[22] Filed: Mar. 24, 1994

[30] Foreign Application Priority Data

Mar. 24, 1993 [JP] Japan .................... 5-065471

[51] Int. Cl.$^6$ .............................. F16H 25/22; F16H 25/24
[52] U.S. Cl. ........................................ 74/424.8 R; 74/459
[58] Field of Search .................. 74/459, 424.8 R, 74/89.15

[56] References Cited

U.S. PATENT DOCUMENTS

| | | | |
|---|---|---|---|
| 2,505,131 | 4/1950 | Means, Jr. .................... | 74/459 |
| 2,581,482 | 1/1952 | Hawkins ....................... | 74/459 |
| 2,890,594 | 6/1959 | Galonska ...................... | 74/424.8 R |
| 3,244,022 | 4/1966 | Wysong, Jr. .................. | 74/424.8 R |
| 3,971,264 | 7/1976 | Detraz et al. ................ | 74/459 |

*Primary Examiner*—Richard M. Lorence
*Attorney, Agent, or Firm*—Sughrue, Mion, Zinn, Macpeak & Seas

[57] ABSTRACT

In a thin-wall type ball nut of a light-weight type ball screw having a trunnion structure in which a pair of trunnion shafts are extended from the ball nut in the opposite directions; a pair of ribs for increasing the wall thickness of the ball nut are formed on both side surfaces of the ball nut in such a manner that the ribs are extended from the base portions of the trunnion shafts along the axis of the ball nut, so as to increase the rigidity of the portions of the nut body which are liable to be deformed, thereby to prevent the ball nut from deformation.

9 Claims, 3 Drawing Sheets

THIN WALL TYPE BALL NUT

BACKGROUND OF THE INVENTION

This invention relates to an improvement of a thin-wall type ball nut of a light-weight type ball screw having a trunnion structure.

In a ball screw having a trunnion structure, a pair of cylindrical trunnion shafts protrude from the outer surface of a ball nut in opposite directions, in such a manner that they have one and the same axis perpendicular to the axis of the ball nut. The ball nut is supported through the trunnion shafts in such a manner that it is rotatable around the axis thereof.

Heretofore, when it is required to reduce the weight of the ball screw of this type, the barrel of the ball nut is decreased in wall thickness.

The conventional thin-wall type ball nut whose barrel is decreased in wall thickness, suffers from the following difficulties: When a great load is applied to the trunnion shafts in the axial direction, the ball nut is liable to be deformed as a whole because the ball nut's barrel is relatively low in rigidity. If the ball nut is deformed in this way, the load is non-uniformly distributed to the steel balls in the ball nut (hereinafter referred to merely as "balls", when applicable); that is, the ball load is locally great, which is one of the factors which may reduce the service life of the ball screw.

SUMMARY OF THE INVENTION

Accordingly, an object of this invention is to eliminate the above-described difficulties accompanying a conventional thin-wall type ball nut of a light-weight type ball screw having a trunnion structure.

More specifically, an object of this invention is to provide a thin-wall type ball nut for a light-weight type ball screw having a trunnion structure in which the ball nut including the base portions of the trunnion shafts is partially increased in rigidity in the axial direction thereof thereby to satisfy two conflicting requirements of decreasing the weight of the ball nut and increasing the rigidity of the same.

The foregoing object and other objects of the invention have been achieved by the provision of a thin-wall type ball nut of a light-weight type ball screw having a trunnion structure in which a pair of cylindrical trunnion shafts extend from the outer surface of the ball nut in opposite directions in such a manner that the trunnion shafts have a common axis perpendicular to the axis of the ball nut, in which, according to the invention, a pair of ribs for increasing the wall thickness of the ball nut are formed on both side surfaces of the ball nut in such a manner that the ribs are extended from the base portions of the pair of trunnion shafts along the axis of the ball nut.

When used, the ball nut having the trunnion structure is supported through the trunnion shafts in such a manner that it is rotatable around its axis. If a great load is applied to the trunnion shafts of the conventional thin-wall ball nut in the direction of axis thereof which is held in the above-described manner, then the ball nut is deformed because it is relatively small in wall thickness. On the other hand, in the ball nut of the invention, portions which are liable to be deformed are reinforced with the ribs; that is, they are increased in rigidity. Hence, even if a large load is applied to the ball nut, the latter will never be deformed. Accordingly, the ball rolling spaces between the spiral grooves where the ball nut confronts with the ball screw shaft are maintained unchanged over the entire length of the nut body at all times. Thus, the nut body is free from the difficulties that the balls in the grooves are non-uniformly loaded; that is, the ball load is locally great, and the ball screw is therefore reduced in service life.

Furthermore, since the reinforcing ribs 4 are locally provided, the increase in weight of ball nut by the addition of the reinforcing ribs is not significant.

The nature, utility and principle of the invention will be more clearly understood from the following detailed description and the appended claim when read in conjunction with the accompanying drawings.

DETAILED DESCRIPTION OF THE PREFERRED EMBODIMENTS

Preferred embodiments of this invention will be described with reference to the accompanying drawings.

Figure 1:
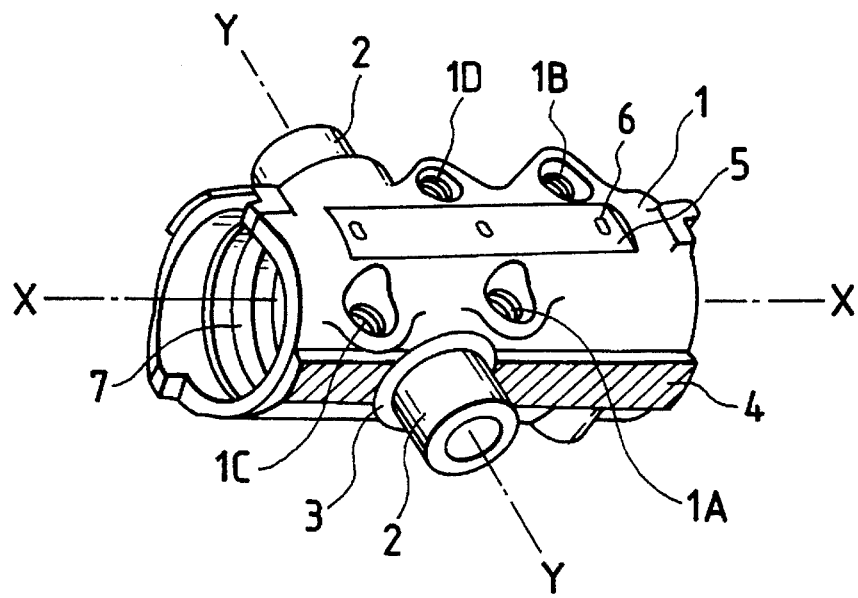
FIG. 1 is a perspective view of one example of a ball nut according to this invention.

An example of a ball nut of a ball screw having a trunnion structure according to the invention is as shown in FIG. 1. The ball nut is a so-called tube-type ball nut. Its body 1 (hereinafter referred to as "a nut body 1", when applicable) has two pairs of tube inserting holes 1A and 1B, and 1C and 1D in its upper outer surface in such a manner that they are arranged staggered. A pair of trunnion shafts 2 and 2, which have an axis Y—Y perpendicular to the axis X—X of the nut body 1, are extended from the outer surface of the ball nut body 1 in the opposite directions. The trunnion shafts 2 and 2 merge through their base portions 3 and 3 to the nut body 1. More specifically, the base portions 3 are stepped, having a diameter larger than that of the bodies of the trunnion shafts 2.

Ribs 4 and 4 are formed on both side surfaces of the nut body 1 in such a manner that they are extended from the base portions 3 and 3 of the trunnion shafts 2 and 2 along the axis X—X of the nut body 1 to increase the wall thickness of the latter 1. The ribs 4 are equal to the base portions 3 in thickness while having a width that is within the width of base portion 3. Furthermore, the ribs 4 are extended over the whole length of the nut body 1.

A flat surface 5 for connecting the ball circulation tubes is formed on the upper surface of the nut body 1 in such a manner that it is extended longitudinally along the nut body 1. In addition, threaded holes 6 are formed in the upper surface of the nut body 1, to fix the ball circulation tubes. Spiral grooves 7 for rolling the balls B are formed in the inner surface of the nut body 1. The spiral grooves 7 are communicated with the above-described tube inserting holes 1A, 1B, 1C and 1D.

Figure 2:
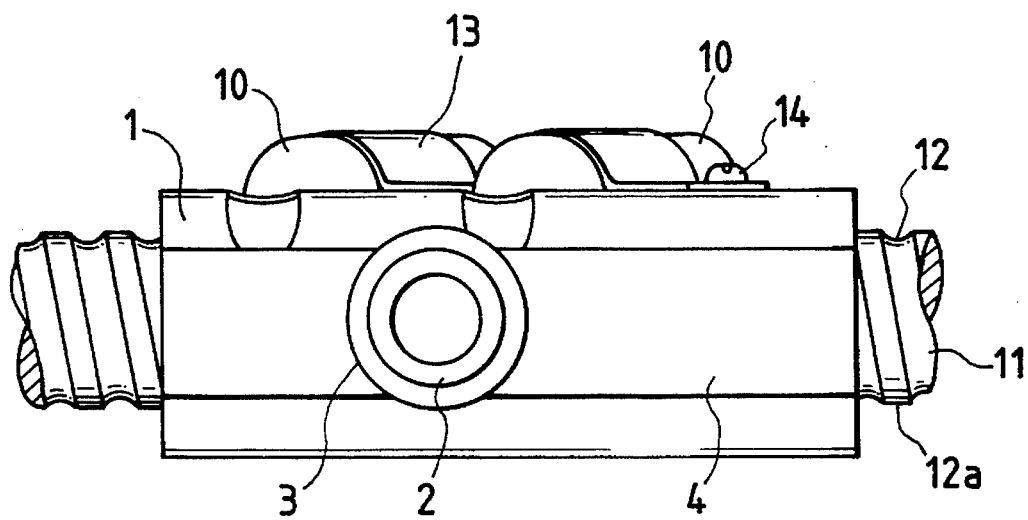
FIGS. 2 and 3 are a side view and a front view, respectively, showing the ball nut of the invention which is in use.
Figure 3:
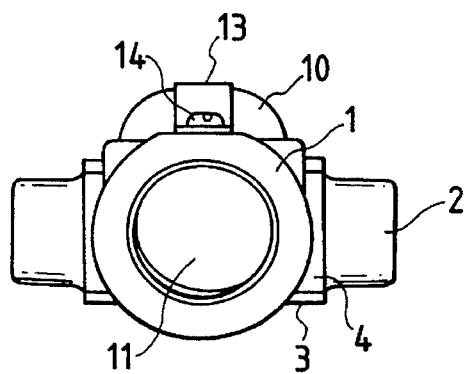
Figure 4:
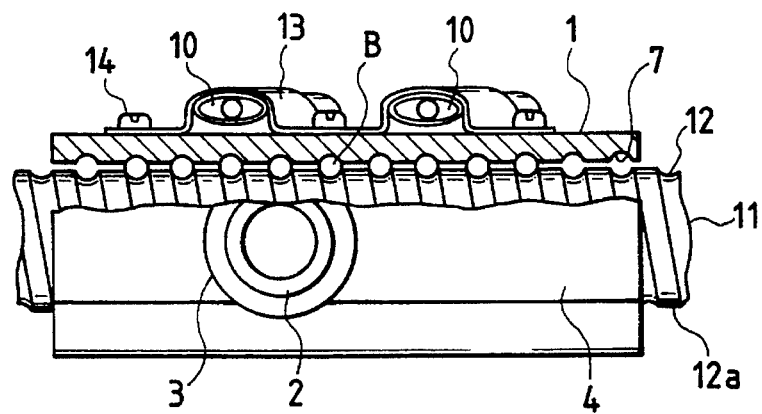
FIG. 4 is a side view, with parts cut away, showing the ball nut of the invention.

As shown in FIGS. 2 through 4, two ball circulation tubes 10 which are substantially U-shaped are coupled to the nut body 1 (FIG. 1) to form ball circulation paths, and the nut body is engaged with a ball screw shaft 11 through a number of balls B. Spiral grooves 12 are formed in the outer surface of the ball screw shaft 11 in correspondence to the spiral grooves 7 of the nut body 1. Both ends of one of the ball circulation tubes 10 are inserted into the tube inserting holes 1A and 1B, respectively, and similarly both ends of the other are inserted into the tube inserting holes 1C and 1D, respectively; that is, the ball circulation tubes 10 are laid obliquely across the spiral grooves. The tubes 10 thus laid are fixedly secured to the flat surface 5 with a tube retainer 13 and screws 14.

As the ball screw shaft 11 is turned, the nut body 1 is moved linearly along the axis of the ball screw shaft 11. In this operation, the balls B are moved while rolling in the confronted spiral grooves 7 and 12, and circulated as follows: When each ball comes near the tube inserting hole 1B (or 1D) turning along the spiral grooves for instance three and half revolutions, it is picked up into the ball circulation tube 10. The ball thus picked up is moved obliquely across the land 12a of the spiral groove 12, and is then returned to the space between the spiral grooves 7 and 12 near the tube inserting holes 1A (or 1C).

In the above-described ball nut, two ball circulation tubes 10 are set in parallel with each other and oblique with respect to the axis of the nut body; however, the invention is not limited thereto or thereby. That is, the number of ball circulation tubes 10 may be one or more than two as the case may be. Furthermore, the tube retainer 13 for fixing the ball circulation tubes 10 to the nut body may be formed by machining a block material.

The functions of the ball nut according to the invention will be described.

The nut body 1 is rotatably supported by the trunnion shafts 2 and 2 when used. It is assumed that, under this condition, a compressing load is applied in the direction of the axis Y—Y of the trunnion shafts 2 and 2 which is great enough to deform the body of the conventional thin-wall type ball nut.

In the nut body 1 of the invention, the ribs 4 are formed on the nut body 1 in such a manner that they extend from the base portions 3 and 3 of the trunnion shafts 2 and 2 along the axis X—X of the nut body 1, to increase the wall thickness thereby to reinforce the nut body 1. Hence, the ball nut is scarcely deformed by the compressing load. Accordingly, the ball rolling spaces between the spiral grooves 7 and 12 are maintained unchanged over the entire length of the nut body 1 at all times. Thus, the nut body is free from the difficulties that the balls B in the grooves are non-uniformly loaded; that is, the ball load is locally great, and the ball screw is therefore reduced in service life.

Furthermore, since the reinforcing ribs 4 are locally provided, the increase in weight of ball nut by the addition of the reinforcing ribs is not so great.

Figure 5:
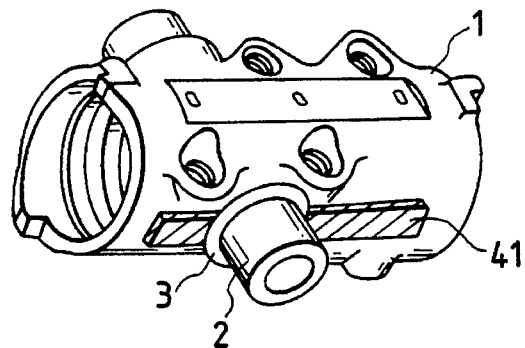
FIGS. 5 through 8 are perspective views of modifications of the ball nut shown in FIG. 1.

The above-describe ball nut may be modified as follows:

A first modification of the ball nut is as shown in FIG. 5 (showing only one rib 41). The rib 41 is smaller in width than the base portion 3 of the trunnion shaft 2. The length of the rib 41 corresponds to the load region of the balls B in the spiral grooves 7 of the nut body; that is, the rib 41 is not provided outside the load region; more specifically, it is not provided near both ends of the nut body 1. The thickness of the rib is equal to that of the base portion 3 of the trunnion shaft 2. The rib 41 is reduced in size as much as possible under the condition that it reinforces the nut body sufficiently. Thus, the ribs 41 are advantageous in that the resultant nut body is smaller in weight than the one shown in FIG. 1.

Figure 6:
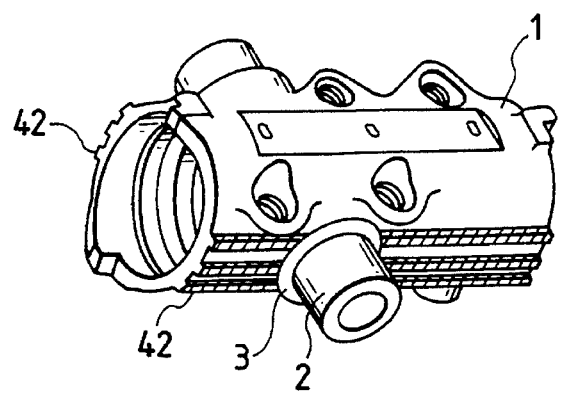

A second modification of the ball nut is as shown in FIG. 6 (showing only one of the ribs). The second modification is designed as follows: A plurality of elongated ribs 42 (three ribs 42 in FIG. 6) are extended over the entire length of the nub body 1, occupying a width within the width of the base portion 3. Each of the ribs 42 is equal in thickness to the base portion 3 of the trunnion shaft 2. The second modification is also advantageous in that the resultant nut body is smaller in weight the one shown in FIG. 1

Figure 7:
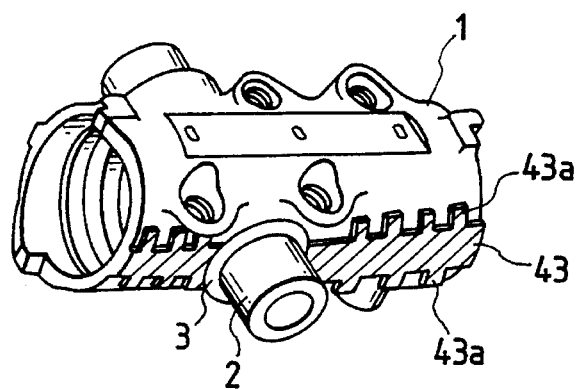

A third modification of the ball nut is as shown in FIG. 7 (showing only one of the ribs). In the third modification, a belt-shaped rib 43 has a number of small pieces 43a extended from its both edges, and is extended over the entire length of the nut body 1, taking a width which is within the width of the base portion 3. Each of the ribs 43 is equal in thickness to the base portion 3 of the trunnion shaft 2. The second modification is also advantageous in that the resultant nut body is smaller in weight the one shown in FIG. 1.

Figure 8:
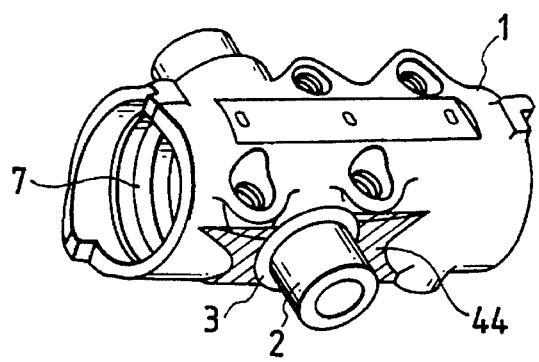

A fourth modification of the ball nut is as shown in FIG. 8 (only one rib shown). The fourth modification is designed as follows: That is, the width of a rib 44 is smaller than that of the base portion 3 of the trunnion shaft 2, and the thickness is largest at the base portion 3 of the trunnion shaft 2, and it is smaller toward both ends of the nut body 1. The length of the rib 44 corresponds to the load region of the balls B in the spiral grooves 7 of the nut body. The nut body with the ribs 44 is smaller than any of the nut bodies shown in FIGS. 1, 5, 6, 7 and 8, and is suitable for the case where a load applied to the trunnion shafts 2 in the axial direction is relatively small.

As was described above, in the thin-wall type ball nut according to the invention, the ribs for increasing the wall thickness of the nut are formed on both side surfaces of the nut in such a manner that they extend from the base portions of the pair of trunnion shafts along the axis of the ball nut. Hence, the portions of the ball nut which are liable to be deformed are increased in rigidity without increasing the weight of the ball substantially. Therefore, even when a great load is applied to the trunnion shafts axially during the use of the ball screw, the ball nut is prevented from being deformed thereby; that is, the ball screw is prevented from being decreased in service life.

While the invention has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A thin-wall type ball nut of a light-weight type ball screw, comprising:

a pair of cylindrical trunnion shafts extending from an outer surface of said ball nut through base portions in opposite directions to each other, said trunnion shafts having a common axis perpendicular to the axis of said ball nut; and a pair of rib members for increasing the wall thickness of said ball nut, said rib members being formed on an outer surface of said ball nut and extending from the base portions of said pair of trunnion shafts in directions which are substantially parallel to the axis of said ball nut and intersect with the common axis.

2. A thin-wall type ball nut according to claim 1, in which said rib members extend over the whole length of said ball nut.

3. A thin-wall type ball nut according to claim 1, in which said rib members are smaller in width than the base portions of said trunnion shaft.

4. A thin-wall type ball nut according to claim 1, in which each of said rib members comprises a plurality of ribs which extend over the entire length of said nut in parallel to each other.

5. A thin-wall type ball nut according to claim 4, in which each of said rib members is equal in thickness to said respective base portions.

6. A thin-wall type ball nut according to claim 2, in which each of said rib members is formed in a belt-shape having a plurality of protrusion pieces extending from both side edges of each of said rib members in circumferential directions of said ball nut on the outer surface.

7. A thin-wall type ball nut according to claim 2, in which each of said rib members has a thickness which is tapered toward an end of said ball nut.

8. A thin-wall type ball nut according to claim 7, in which the thickness is largest at respective ones of said base portions.

9. A light-weight type ball screw device, comprising:

a ball screw including a first spiral groove formed on an outer surface thereof;

a ball nut including a second spiral groove formed in an inner surface thereof, a pair of cylindrical trunnion shafts extending from an outer surface of the ball nut through base portions in opposite directions to each other and having a common axis which is perpendicular to an axis of the ball nut, and a pair of rib members formed on the outer surface of the ball nut and extending from the base portions of respective ones of the trunnion shafts in directions which are substantially parallel to the axis of the ball nut and which intersect with the common axis; and a plurality of balls rolling in a space formed between the first and second spiral grooves, each of the rib members extending to a portion on the outer surface corresponding to a region where the balls apply a load in the second spiral groove.

* * * * *